US008075989B2

(12) United States Patent
Borgwardt et al.

(10) Patent No.: US 8,075,989 B2
(45) Date of Patent: Dec. 13, 2011

(54) PERFORATED LAMINATED POLYMERIC FOAM ARTICLES

(75) Inventors: Anett Borgwardt, Au (CH); John Gordon-Duffy, La Wantzenau (FR)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 12/875,539

(22) Filed: Sep. 3, 2010

(65) Prior Publication Data

US 2011/0076446 A1    Mar. 31, 2011

Related U.S. Application Data

(60) Provisional application No. 61/245,680, filed on Sep. 25, 2009.

(51) Int. Cl.
*B32B 3/26* (2006.01)
*B32B 37/12* (2006.01)

(52) U.S. Cl. .................. 428/316.6; 428/131; 428/318.6; 428/318.8; 156/60

(58) Field of Classification Search ............... 428/316.6, 428/131, 318.8, 318.6; 156/60
See application file for complete search history.

(56) References Cited

U.S. PATENT DOCUMENTS

| 3,295,278 | A | | 1/1967 | Muhm | |
|---|---|---|---|---|---|
| 5,584,958 | A | * | 12/1996 | Gillis et al. | ................. 156/331.4 |
| 6,160,029 | A | * | 12/2000 | Chaudhary et al. | ........... 521/139 |
| 6,432,512 | B1 | * | 8/2002 | Brandolini | ................... 428/159 |

FOREIGN PATENT DOCUMENTS

| DE | 3523779 | 1/1987 |
|---|---|---|
| DE | 19548381 | 12/1995 |
| EP | 1026194 | 8/2000 |
| EP | 1213118 | 6/2002 |
| EP | 1734193 | 12/2006 |
| JP | 2002161590 | 4/2002 |
| JP | 2004042335 | 12/2004 |
| WO | 0073599 | 12/2000 |
| WO | 0170861 | 9/2001 |
| WO | 2010036562 | 4/2010 |

* cited by examiner

*Primary Examiner* — Hai Vo
(74) *Attorney, Agent, or Firm* — Steven W. Mork

(57) ABSTRACT

A polymeric foam article has at least two thermoplastic polymer foams in layered orientation, each of the thermoplastic polymer foams having an adjoining surface that contains a polymer skin, a thickness dimension perpendicular to the adjoining surface, perforations that are less than one millimeter in diameter that penetrate through the adjoining surface to a depth less than the thickness dimension of the foam, where the adjoining surface of one thermoplastic polymer foam is adjacent and adhered to the adjoining surface of another thermoplastic polymer foam with an adhesive thereby affixing the thermoplastic polymer foams to one another.

12 Claims, No Drawings

PERFORATED LAMINATED POLYMERIC FOAM ARTICLES

CROSS REFERENCE STATEMENT

This application claims the benefit of U.S. Provisional Application No. 61/245,680, filed Sep. 25, 2009, the entire content of which is incorporated herein by reference.

BACKGROUND OF THE INVENTION

1. Field of the Invention

The present invention relates to laminated polymeric foam articles and a process for preparing the laminated polymeric foam article.

2. Description of Related Art

Polymeric foam articles have utility as thermally insulating materials. Polymeric foam articles serve as thermal insulation in building and construction applications, appliance applications and nearly any other application where thermal insulation is valuable. Increasing the thickness of polymeric foam articles tends to reduce the thermal conductivity (that is, increase thermal resistance) through the articles, all other properties being equal. However, increasing foam thickness is not necessarily easy, particularly for extruded polymeric foam articles.

Extrusion foam processes expel a foamable polymer composition through a foaming die that, to a large extent, controls the size and shape of resulting extruded polymeric foam. As the cross sectional area of the foaming die opening increases to enable manufacturing of larger cross section foam articles the extrusion process becomes more difficult to control. For example, foam surface skin begins to become irregular as pressures become harder to maintain constant. Hence, it becomes difficult to prepare quality extruded polymeric foam as the cross sectional dimensions (including thickness) of the polymeric foam increases.

One solution to preparing quality extruded polymeric foams of significant thickness is by laminating multiple thinner extruded polymeric foams together in a layered fashion. EP1734193A1, for example, describes a stacking and gluing multiple extruded polymeric foams together to form a thick thermoinsulating panel. U.S. patent application Ser. No. 61/100,830 ('830) also describes laminated polymer foams together to achieve a thick acoustically attenuating article. Foams in '830 are perforated all the way through prior to lamination in order to increase air flow through the foam using needles having a diameter of one millimeter or more. Unfortunately, merely laminating extruded polymeric foams together effectively and aesthetically can be challenging. Extruded polymeric foams typically have a polymer skin on their surfaces that are not perfectly planar. Therefore, it can be problematic to glue together extruded polymeric foam containing their skins since contact between foam surfaces may only be sporadic. Moreover, air gaps can exist between adjoining foam surfaces if the surfaces are not perfectly flat. Air gaps can draw and retain moisture, which is undesirable for thermal insulation.

EP1213118B1 discloses an advance in preparing laminated thermally insulating foam articles by first removing the skin surface from adjoining polymeric foams prior to adhering them together. By removing the skins the foam surfaces can be made planar and vapor can transfer with more freedom between the foams than if the skins remained. However, removing skin from foam surfaces requires a skiving step and produces a considerable amount of scrap polymer that must be either disposed of or recycled in some fashion.

It would be desirable to find a way to optimize adhesion between extruded polymeric foams without having to remove the skins of adjoining foam surfaces, particularly if tensile bond strengths at the interface exceed that of a unitary foam structure. Yet more desirable is if vapor could still transfer between foams across the adhesion interface.

BRIEF SUMMARY OF THE INVENTION

The present invention offers a solution to the problem of optimizing adhesion between extruded polymeric foams without having to remove skins of adjoining surfaces while also enhancing vapor transfer between the foams and the adhesion interface. Surprisingly, the present invention is a result of discovering that perforating adjoining surfaces of polymeric foam using puncturing tools having a diameter less than one millimeter not only facilitates vapor transfer between the foams but result in better adhesion between laminated polymeric foams than if the adjoining surfaces were perforated with larger diameter puncturing tools. Even more surprising is the discovery that perforations having a diameter less than one millimeter not only result in tensile strengths that exceed that of larger diameter perforations but can achieve tensile strengths greater than that of a unitary foam structure. This is surprising because an artisan would expect larger diameter perforations to offer larger cavities for adhesive to penetrate to enhance mechanical binding between surfaces. Surprisingly, larger diameter perforations result in weaker tensile bond strength between laminated foams.

In a first aspect, the present invention is a polymeric foam article comprising at least two thermoplastic polymer foams in layered orientation, each of the thermoplastic polymer foams having: (a) an adjoining surface that contains a polymer skin; (b) a thickness dimension perpendicular to the adjoining surface; (c) perforations that are less than one millimeter in diameter that penetrate through the adjoining surface to a depth less than the thickness dimension of the foam; wherein the adjoining surface of one thermoplastic polymer foam is adjacent and adhered to the adjoining surface of another thermoplastic polymer foam with an adhesive thereby affixing the thermoplastic polymer foams to one another.

In a second aspect, the present invention is a process for preparing the polymeric foam article of the first aspect, the process comprising: (a) providing at least two thermoplastic polymer foams each having an adjoining surface that contains a polymer skin, a thickness dimension perpendicular to the adjoining surface, and perforations that are less than one millimeter in diameter that penetrate through the adjoining surface to a depth less than the thickness of the foam; (b) applying adhesive to at least one adjoining surface; (c) positioning two thermoplastic polymer foams in a layered orientation so that the adjoining surface of one thermoplastic polymer foam is adjacent to an adjoining surface of another thermoplastic polymer foam with the adhesive between the two thermoplastic polymer foams; and (d) adhering the thermoplastic polymer foams together with the adhesive between the thermoplastic polymer foams.

The process of the present invention is useful for preparing the polymeric foam article of the present invention. The polymeric foam article of the present invention is useful for, as an example, thermal insulation.

DETAILED DESCRIPTION OF THE INVENTION

Test methods refer to the most recent test method as of the priority date of this document when a date is not indicated with the test method number. References to test methods contain both a reference to the testing society and the test method number. Test method organizations are referenced by one of the following abbreviations: ASTM refers to American Society for Testing and Materials; EN refers to European Norm; DIN refers to Deutches Institute fur Normung; and ISO refers to International Organization for Standards.

Foams and foam articles have mutually orthogonal length, width and thickness dimensions. Length has a magnitude equal to the dimension having the largest magnitude and for extruded foam typically lies in the extrusion direction of the foam. Width has a magnitude equal to or greater than the thickness and can be equal to the length.

"Primary surface" corresponds to a surface having the greatest planar surface area of any surface of the foam or foam article. Planar surface area is the surface area of a projection of a surface onto a plane so as to avoid accounting for surface texture (for example, pits, peaks or waves in the surface) in the surface area magnitude. Generally, the length and width define the primary surface of a polymeric foam article. Thickness often separates the primary surface from an opposing surface, which may also be a primary surface, of a polymeric foam article.

"Surface skin" or "polymer skin" of polymeric foam is a continuous polymeric film on a surface of polymeric foam, particularly extruded polymeric foam. The polymer skin is typically non-porous and is common on extruded polymeric foam. The surface skin is removable by methods such as skiving.

"Layered orientation" corresponds to an orientation where the surface of one component is adjacent to the surface of another. For example, two foams are in a layered orientation when the surface of one foam is adjacent to the surface of another. Desirably, foams in a layered orientation have their primary surfaces adjacent to one another.

An "adjoining surface" is a surface of thermoplastic polymer foam that is, or will be upon preparing the article of the present invention, adjacent to a surface (an "adjoining surface") of another thermoplastic polymer foam.

"Foamable adhesive" is an adhesive that expands into foam upon application to a substrate, or between substrates. A foamable adhesive may or may not remain as foam, but desirable remains in a foam structure when adhering substrates together.

"Diffusion open" has definition in DIN4108-3 (2001) as having a water vapor diffusion equivalent air thickness ($S_D$-value) of 0.5 meters or less. This is the definition for "diffusion open" adopted herein. Determine whether a material is diffusion open according to DIN 4108-3 (2001).

The polymeric foam article of the present invention comprises at least two thermoplastic polymer foams in layered orientation. The thermoplastic polymer foams can be the same or different from one another as long as they each have the following properties: (a) a surface (an "adjoining surface") that contains a polymer skin; (b) a thickness dimension perpendicular to the adjoining surface; and (c) perforations that are less than one millimeter in diameter that penetrate through the adjoining surface to a depth less than the thickness dimension of the foam. Desirably, though not necessarily, the thermoplastic polymer foams are of the same composition.

Suitable thermoplastic polymer foams include expanded polymer bead foams and extruded polymer foams. Expanded polymer bead foams are different from extruded polymer foams both in how they are made and in their final structure. Expanded polymer bead foams comprise multiple foam beads adhered to one another to form a foam structure. Each foam bead has a skin that encloses a group of foam cells and defines the bead. In the expanded polymer bead foam the bead skins form a skin network that extends throughout the foam in all directions, generally interconnecting surface of the expanded polymer bead foam. Extruded polymer foams are free of such a skin network that encloses a group of cells and that extends throughout the foam in all directions. Notably, bead skins are visibly thicker and distinct from cell walls. Desirably, at least one, preferably all the thermoplastic polymer foams in the polymeric foam article of the present invention are extruded thermoplastic foam. The network of skins in expanded bead foam can serve as a thermal short through the foam that increases thermal conductivity through the foam and can serve as conduit for moisture penetration into the foam since there are open voids along the adjoining bead skins that can accommodate moisture.

The thermoplastic polymer foam comprises a thermoplastic polymer matrix that defines a multitude of cells. The thermoplastic polymer matrix has a continuous phase of thermoplastic polymer. Typically, 50 weight-percent (wt %) or more, preferably 75 wt % or more, still more preferably 90 wt % or more of the polymers in the thermoplastic polymer matrix are thermoplastic polymers. 100 wt % of the polymers in the thermoplastic polymer matrix can be thermoplastic polymers.

Suitable thermoplastic polymer for the thermoplastic polymer matrix includes any thermoplastic polymer or combination of thermoplastic polymers provided the combination of polymers is sufficiently compatible to all foam formation. Particularly desirable thermoplastic polymers include homopolymers and copolymers of olefins such as polyethylene and polypropylene as well as homopolymers and copolymers of aromatic monomers such as alkenyl-aromatic polymers. Styrenic polymers are particularly desirable alkenyl-aromatic polymers and include polystyrene homopolymer and styrenic copolymers. Examples of suitable styrenic copolymers include copolymer of styrene with one or more of the following: acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. Styrene acrylonitrile copolymer (SAN) is one particularly desirable thermoplastic polymer due at least in part to its high service temperature.

The thermoplastic polymer foam can contain any one or combination of more than one additive, typically dispersed in the thermoplastic polymer matrix. Examples of suitable additives include: infrared attenuating agents (for example, carbon black, graphite, metal flake, titanium dioxide); clays such as natural absorbent clays (for example, kaolinite and montmorillonite) and synthetic clays; nucleating agents (for example, talc and magnesium silicate); flame retardants (for example, brominated flame retardants such as hexabromocyclododecane and brominated polymers, phosphorous flame retardants such as triphenylphosphate, and flame retardant packages that may including synergists such as, or example, dicumyl and polycumyl); lubricants (for example, calcium stearate and barium stearate); and acid scavengers (for example, magnesium oxide and tetrasodium pyrophosphate). Additives typically are present at a concentration of up to ten percent by weight based on total polymer weight.

Each thermoplastic polymer foam can have the same or different densities. Desirably at least one, preferably all thermoplastic polymer foams in the present invention have a density of 40 kilograms per cubic meter ($kg/m^3$) or less, preferably 38 $kg/m^3$ or less, still more preferably 36 $kg/m^3$ or less and most preferably 34 $kg/m^3$ or less. Lower density foams are easier to handle and generally are less expensive than higher density foams. Typically, the thermoplastic polymeric foam has a density of 18 kg/m³ or more in order to be mechanically sound. Determine foam density according to either DIN ISO 845 or EN1602.

Each thermoplastic polymer foam can independently be either open celled or closed cell foam. Thermoplastic polymer foam desirably has an open cell content of 30% or less, preferably 20% or less, still more preferably 10% or less, and yet more preferably five percent or less and can be one or even zero percent. Determine open cell content according to DIN ISO 4590.

At least two thermoplastic polymer foams have adjoining surfaces that are adjacent to one another and adhered to one another with an adhesive. The adjoining surfaces contain a polymer skin that covers 50% or more, preferably 75% or more, still more preferably 90% or more and yet more preferably 95% or more of the adjoining surface's surface area. Typically, the adjoining surface is a primary surface or is opposite a primary surface of a thermoplastic polymer foam. The thickness dimension of these thermoplastic polymer foams is perpendicular to their adjoining surface. Additionally, the adjoining surfaces are perforated in a manner that penetrates the adjoining surface and extends into the thermoplastic polymer foam to a depth less than the thickness dimension of the foam. Therefore, perforations extend into each adjoined foam through the adjoining surfaces, but not all the way through either foam.

The adhesive adhering adjoining surfaces of adjacent thermoplastic polymer foams can be any adhesive in the broadest scope of the present invention. Desirably, the adhesive is diffusion open, particularly if the adhesive covers an entire adjoining surface of one or both foams it adheres together. Examples of suitable diffusion open adhesives include one and two component polyurethanes, hot melt adhesives and reactive adhesives.

Generally, apply the adhesive to one of the adjoining surface prior to adhering the adjoining surface of two thermoplastic polymer foams together. Alternatively apply adhesive to both adjoining surface prior to adhering the adjoining surfaces together. Typically, the adhesive is present between adjoining surfaces at a concentration of 40 grams per square meter (g/m²), preferably 80 g/m² or more. At the same time, the adhesive is desirably present at a concentration of 1500 g/m² or less, preferably 250 g/m² or less. Concentration is relative to surface area of one of the two adjoining surfaces adhered together by the adhesive.

The perforations in the thermoplastic polymer foams have a diameter that is one millimeter or less. This is a particularly surprising aspect of the present invention in view of the tensile strength of the foam article achieves. Typically, one would expect optimal adhesion to occur with larger diameter perforations so that adhesive can penetrate into the perforation to enhance mechanical bonding to the foam. Research leading to the present invention has discovered that is not the case. In fact, perforations of one millimeter or less demonstrate greater adhesion strength than larger diameter perforations. Typically, the diameters of the perforations are one millimeter or less and 0.1 millimeters or more, preferably 0.5 millimeters or more. The diameter of a perforation is the largest dimension of the perforation. Perforations are desirably circular in cross-sectional shape, or near circular (aspect ratio of two or less).

It is desirably to have an average perforation concentration through an adjoining surface that results in one square millimeter or more of perforated surface area (or perforated area) for every square centimeter of adjoining surface area (mm²/cm²). Desirably, the perforated surface area is 2.8 mm²/cm² or more, three mm²/cm² or more, even five mm²/cm² or more. The perforated surface area is 50% or less than the planar surface area of the perforated surface in order to retain skin on at least 50% of the surface.

The article of the present invention requires at least two thermoplastic polymer foams in layered orientation, but is not limited to only two thermoplastic polymer foams in layered orientation. In other words, the article can comprise three or more, four or more, even five or more thermoplastic polymer foams in layered orientation. One desirable embodiment comprises at least three thermoplastic polymer foams each having a thickness dimension where the first two of the thermoplastic copolymer foams have at least one adjoining surface and at least the third thermoplastic polymer foam has two opposing adjoining surfaces wherein each adjoining surface contains a polymer skin and perforations that are less than one millimeter in diameter that penetrate through the adjoining surface to a depth less than the thickness dimension of the foam wherein an adjoining surface of two of the thermoplastic polymer foams are adjacent to opposing adjoining surfaces of the third thermoplastic polymer foam and the thermoplastic polymer foams are affixed to one another with an adhesive.

The process of the present invention serves to prepare the article of the present invention. The process of the present invention comprises at least four steps.

The first step of the present process is to provide at least two thermoplastic polymer foams each having an adjoining surface that contains a polymer skin, a thickness dimension perpendicular to the adjoining surface and perforations that are less than one millimeter in diameter that penetrate through the adjoining surface to a depth less than the thickness of the foam. These thermoplastic polymer foams are as described and characterized earlier for the article of the present invention, including perforation characteristics. The first process step can comprise perforating the foam to create perforated thermoplastic polymer foam as described earlier.

The second step of the present process is to apply adhesive to at least one adjoining surface. The adhesive and coating concentration is as described earlier for the article of the present invention. The adhesive can be applied as a type of foam itself. That is, the adhesive can be a foamable adhesive. The adhesive may remain as a foam in the final article or collapse during processing to result in a non-foamed adhesive in the final article.

The third step is to position two thermoplastic polymer foams in a layered orientation so that the adjoining surface of one thermoplastic polymer foam is adjacent to an adjoining surface of another thermoplastic polymer foam with the adhesive between the two thermoplastic polymer foams.

The fourth step is to adhere the thermoplastic polymer foams together with the adhesive between the two foams. Desirably, press the thermoplastic polymer foams together with the adhesive between them to ensure best contact between the adhesives and the foams.

The process can further comprise providing and adhering together at least three thermoplastic polymer foams according to the present process by step (a) including providing at least three thermoplastic foams each having a thickness dimension wherein the first two of the thermoplastic polymer foams have at least one adjoining surface and at least the third thermoplastic polymer foam has two opposing adjoining surfaces wherein each adjoining surface contains a polymer skin and perforations that are less than one millimeter in diameter that penetrate through the adjoining surface to a depth less than the thickness dimension of the foam, step (b) including positioning the thermoplastic polymer foams so that an adjoining surface of two of the thermoplastic polymer foams are adjacent to opposing adjoining surfaces of the third thermoplastic polymer foam and step (c) includes adhering the thermoplastic polymer foams to one another with adhesive between the foams.

EXAMPLES

The present examples serve to illustrate embodiments of the present invention. For ease of comparison, the samples and their properties are summarized in Table 1.

Reference. Provide two boards of extruded polystyrene (XPS) foam (ROOFMATE® SP-X, ROOFMATE is a trademark of The Dow Chemical Company), each having a thickness of 60 millimeters. The XPS foam boards have skins on their primary surfaces. Apply a two-part polyurethane adhesive (for example, SIKA™ FORCE 7010 with SIKA™ FORCE 7710 L100 at a ratio of 5:1; SIKA is a trademark of Sika AG corporation) to the primary surface of one of the XPS foam boards at a coating density of 1000 grams per square meter of surface. Position the other XPS foam over the adhesive-coated surface of the one foam and set them together. Apply a compressive force of 2.5 kilograms per square centimeter to the boards for 24 hours to compress them together. Measure the tensile bond strength between the boards according to standard set forth in EN1607.

Comparative Example A

Prepare and test Comparative Example (Comp Ex) A like the Reference, except perforate the surfaces (adjoining surfaces) of the XPS foams that will be adhered together using a roller fitted with pins having a diameter of two millimeters. The pin placement on the roller is such that the perforated surfaces of the XPS foams have a perforated area of 1.64 square millimeters per square centimeter of surface area (mm$^2$/cm$^2$). The depth of the perforations into the XPS foams is five millimeters.

Comparative Example B

Prepare and test Comp Ex B like Comp Ex A except position the pins so that the perforated surfaces of the XPS foams have a perforated area of 4.15 mm$^2$/cm$^2$.

Example 1

Prepare and test Example (Ex) 1 like Comp Ex A except use pins having a diameter of 0.8 millimeters and position them such that the perforated surfaces of the XPS foams have a perforated area of 0.50 mm$^2$/cm$^2$.

Examples 2-5

Prepare and test Exs 2-5 like Ex 1 except position the pins such that the perforated surfaces of the XPS foams have a perforated area of 1.57, 2.78, 2.80 and 5.12 mm$^2$/cm$^2$ for Exs 2-5 respectively.

TABLE 1

| Sample | Pin Diameter (millimeters) | Perforation Area (mm$^2$/cm$^2$) | Tensile Strength (kilopascals) |
|---|---|---|---|
| Reference | N/A | N/A | 285 |
| Comp Ex A | 2 | 1.64 | 213 |
| Comp Ex B | 2 | 4.15 | 219 |
| Ex 1 | 0.8 | 0.50 | 243 |
| Ex 2 | 0.8 | 1.57 | 267 |
| Ex 3 | 0.8 | 2.78 | 317 |
| Ex 4 | 0.8 | 2.80 | 437 |
| Ex 5 | 0.8 | 5.12 | 342 |

These results illustrate that articles prepared from foams perforated with a two millimeter diameter pin have a uniform tensile strength regardless of the perforation area. Moreover, that tensile strength is less than the tensile strength of articles prepared from foams perforated with a 0.8 mm diameter pin having a perforation area ranging from below (for example, 0.5 mm$^2$/cm$^2$) to above (for example, 5.1 mm$^2$/cm$^2$) that of the two millimeter diameter perforations. Surprisingly, the smaller perforation holes result in stronger tensile strength than the larger perforation holes regardless of the perforation area.

Even more surprising, when the perforation area is 2.78 or higher for the 0.8 millimeter diameter perforation, the tensile strength exceeds that of the non-perforated foam. However, the tensile strength for the articles having two millimeter diameter perforations are consistently below that of the non-perforated foam.

The invention claimed is:

1. A polymeric foam article comprising at least two thermoplastic polymer foams in layered orientation, each of the thermoplastic polymer foams having:
    (a) an adjoining surface that contains a polymer skin;
    (b) a thickness dimension perpendicular to the adjoining surface;
    (c) perforations that have a diameter of 0.5 millimeters or more and one millimeter or less and that penetrate through the adjoining surface to a depth less than the thickness dimension of the foam; wherein the adjoining surface of one thermoplastic polymer foam is adjacent and adhered to the adjoining surface of another thermoplastic polymer foam with an adhesive thereby affixing the thermoplastic polymer foams to one another and wherein the total perforation area is at least 2.80 square millimeters per square centimeter of adjoining surface and the perforated surface area is 50% or less of the planar surface area of the perforated surface, wherein the perforated foam has a higher tensile strength than the foam having no perforations.

2. The polymeric foam article of claim 1, wherein the adhesive is selected from a group consisting of one component polyurethane, two component polyurethane and hot melt adhesives.

3. The polymeric foam article of claim 1, wherein the adhesive is present at a concentration in a range of 40 to 1500 grams per square meter of adjoining surface area.

4. The polymeric foam article of claim 1, further characterized by the perforations occupying an area of one square millimeter or more per square centimeter of adjoining surface area for each of the two adjoining surfaces that are adjacent to one another.

5. The polymeric foam article of claim 1, further characterized by polymer skin covering at least 50 percent of the surface area of each adjoining surface that is adhered to another adjoining surface.

6. The polymeric foam article of claim 1, comprising at least three thermoplastic polymer foams each having a thickness dimension wherein the first two of the thermoplastic polymer foams have at least one adjoining surface and at least the third thermoplastic polymer foam has two opposing adjoining surfaces wherein each adjoining surface contains a polymer skin and perforations that are less than one millimeter in diameter that penetrate through the adjoining surface to a depth less than the thickness dimension of the foam wherein an adjoining surface of two of the thermoplastic polymer foams are adjacent to opposing adjoining surfaces of the third thermoplastic polymer foam and the thermoplastic polymer foams are affixed to one another.

7. The polymeric foam article of claim 1, further characterized by having a perforated surface area that is five square millimeters or more per square centimeter of adjoining surface.

8. A process for preparing the polymeric foam article of claim 1, the process comprising:
(a) providing at least two thermoplastic polymer foams each having an adjoining surface that contains a polymer skin, a thickness dimension perpendicular to the adjoining surface, and perforations that are 0.5 millimeters or more and one millimeter or less in diameter and that penetrate through the adjoining surface to a depth less than the thickness of the foam, wherein the total perforation area is at least 2.80 square millimeters per square centimeter of adjoining surface and the perforated surface area is 50% or less of the planar surface area of the perforated surface;
(b) applying adhesive to at least one adjoining surface;
(c) positioning two thermoplastic polymer foams in a layered orientation so that the adjoining surface of one thermoplastic polymer foam is adjacent to an adjoining surface of another thermoplastic polymer foam with the adhesive between the two thermoplastic polymer foams; and
(d) adhering the thermoplastic polymer foams together with the adhesive between the thermoplastic polymer foams.

9. The process of claim 8, wherein the adhesive is applied as a foam.

10. The process of claim 8, wherein the adhesive is selected from a group consisting of one component polyurethane, two component polyurethane and hot melt adhesives.

11. The process of claim 8, wherein step (a) includes perforating
the adjoining surfaces of the at least two thermoplastic polymer foams so as to create a perforation density of five square millimeter or more per square centimeter of adjoining surface area for the two adjoining surfaces that are positioned adjacent to one another in step (b).

12. The process of claim 8, further characterized by step (a) including providing at least three thermoplastic foams each having a thickness dimension wherein the first two of the thermoplastic polymer foams have at least one adjoining surface and at least the third thermoplastic polymer foam has two opposing adjoining surfaces wherein each adjoining surface contains a polymer skin and perforations that are 0.5 millimeters or more and less than one millimeter in diameter that penetrate through the adjoining surface to a depth less than the thickness dimension of the foam, step (b) including positioning the thermoplastic polymer foams so that an adjoining surface of two of the thermoplastic polymer foams are adjacent to opposing adjoining surfaces of the third thermoplastic polymer foam and step (c) includes adhering the thermoplastic polymer foams to one another with adhesive between the foams.

* * * * *